(12) United States Patent
Liu et al.

(10) Patent No.: US 11,194,190 B2
(45) Date of Patent: Dec. 7, 2021

(54) DISPLAY PANEL AND DISPLAY DEVICE

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Xiaolong Liu, Beijing (CN); Zhihui Wang, Beijing (CN); Changgong Zhu, Beijing (CN); Jianghong Wen, Beijing (CN); Keguo Liu, Beijing (CN); Xuefeng Wang, Beijing (CN); Yanli Zhao, Beijing (CN); Guang Wang, Beijing (CN); Di Wang, Beijing (CN); Yu Wang, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/012,834

(22) Filed: Sep. 4, 2020

(65) Prior Publication Data
US 2021/0124214 A1    Apr. 29, 2021

(30) Foreign Application Priority Data
Oct. 25, 2019 (CN) .......................... 201911025468.5

(51) Int. Cl.
*G02F 1/1335* (2006.01)
*G02F 1/13357* (2006.01)

(52) U.S. Cl.
CPC .. *G02F 1/133514* (2013.01); *G02F 1/133512* (2013.01); *G02F 1/133608* (2013.01); *G02F 1/133612* (2021.01)

(58) Field of Classification Search
CPC ......... G02F 1/133608; G02F 1/133612; G02F 1/133615
See application file for complete search history.

(56) References Cited

U.S. PATENT DOCUMENTS

| | | | |
|---|---|---|---|
| 2008/0030645 A1* | 2/2008 | Nam ................. | G02F 1/133608 349/61 |
| 2017/0127166 A1* | 5/2017 | Noma .................... | H04R 1/04 |

(Continued)

FOREIGN PATENT DOCUMENTS

| | | |
|---|---|---|
| CN | 103309083 A | 9/2013 |
| CN | 103487968 A | 1/2014 |

(Continued)

OTHER PUBLICATIONS

"Notice of First Review Opinion and English language translation", CN Application No. 201911025468.5, dated Sep. 28, 2021, 11 pp.

*Primary Examiner* — James A Dudek
(74) *Attorney, Agent, or Firm* — Myers Bigel, P.A.

(57) ABSTRACT

The present application provides a display panel and a display device. The display panel includes an array substrate and a color filter substrate arranged oppositely, and a light source on a side of the color filter substrate facing the array substrate. The color filter substrate includes a first region and a second region. An orthogonal projection of the array substrate on the color filter substrate is in the first region, and the light source is in the second region.

13 Claims, 3 Drawing Sheets

(56) References Cited

U.S. PATENT DOCUMENTS

2018/0149807 A1\* 5/2018 Seo ..................... G02B 6/005
2019/0129229 A1 5/2019 Cui et al.
2019/0196250 A1 6/2019 Kim et al.

FOREIGN PATENT DOCUMENTS

| CN | 104516150 A | 4/2015 |
| CN | 104765197 A | 7/2015 |
| CN | 107632475 A | 1/2018 |
| CN | 107728365 A | 2/2018 |
| CN | 207148478 U | 3/2018 |
| KR | 20190075502 A | 7/2019 |

\* cited by examiner

DISPLAY PANEL AND DISPLAY DEVICE

CROSS REFERENCE TO RELATED APPLICATION(S)

The present application claims the priority of Chinese patent application No. 201911025468.5 filed on Oct. 25, 2019, the entire disclosure of which is incorporated herein by reference.

TECHNICAL FIELD

The present disclosure relates generally to the field of display devices, and in particular to the field of liquid crystal display devices, specifically to a display panel and a display device.

BACKGROUND

A liquid crystal display module mainly comprises two portions: a liquid crystal panel and a backlight.

In an existing liquid crystal display module, the backlight is usually arranged on the same side of the liquid crystal panel as a printed circuit board. On this side, it is often necessary to make the backplate to be U-folded, so as to fix a light strip and support the liquid crystal panel. Meanwhile, the U-folded part of the backplate is further used as a shade of the light strip, so that the thickness of the liquid crystal display module may not be reduced any further.

SUMMARY

According to an aspect of the present disclosure, a display panel is provided. The display panel comprises: an array substrate and a color filter substrate arranged oppositely, and a light source located on a side of the color filter substrate facing the array substrate. Specifically, the color filter substrate comprises a first region and a second region, wherein an orthogonal projection of the array substrate on the color filter substrate is located in the first region, and the light source is located in the second region.

According to a specific implementation, in the display panel provided by an embodiment of the present disclosure, the light source comprises a plurality of sub light sources, and the plurality of sub light sources are arranged at intervals along a linear direction in the second region.

According to a specific implementation, in the display panel provided by an embodiment of the present disclosure, the linear direction comprises a length direction of the color filter substrate.

According to a specific implementation, in the display panel provided by an embodiment of the present disclosure, the plurality of sub light sources are arranged at equal intervals.

According to a specific implementation, in the display panel provided by an embodiment of the present disclosure, the light source comprises: a fixation pedestal for a fixed connection with the color filter substrate, and a light-emitting face facing the array substrate. Specifically, the fixation pedestal comprises a first light-shielding part and a second light-shielding part spaced apart from each other, and an intermediate part sandwiched between the first light-shielding part and the second light-shielding part, wherein the light-emitting face is located on the intermediate part, and the first light-shielding part is closer to the color filter substrate than the second light-shielding part.

According to another aspect of the present disclosure, a display device is provided. The display device comprises: a backplate, as well as a reflective layer, a light guide layer, an array substrate, and a color filter substrate arranged sequentially on the backplate, and also a light source located on a side of the color filter substrate facing the array substrate. Specifically, the color filter substrate comprises a first region and a second region, wherein an orthogonal projection of the array substrate on the color filter substrate is located in the first region, and the light source is located in the second region.

According to a specific implementation, in the display device provided by an embodiment of the present disclosure, the light source comprises a light-emitting face facing the light guide layer, and the display device further comprises a printed circuit board located on a different side of the backplate from the light source.

According to a specific implementation, the display device provided by an embodiment of the present disclosure further comprises: a light-shielding strip located on a side of the color filter substrate facing the array substrate, wherein an orthogonal projection of the light-shielding strip on the color filter substrate is sandwiched between orthogonal projections of the array substrate and the light source on the color filter substrate.

According to a specific implementation, in the display device provided by an embodiment of the present disclosure, the light-shielding strip adjoins to the light source with a side facing the light source, and the light-shielding strip adjoins to the light guide layer with a side facing the light guide layer.

According to a specific implementation, in the display device provided by an embodiment of the present disclosure, the light-shielding strip extends along a length direction of the color filter substrate.

According to a specific implementation, in the display device provided by an embodiment of the present disclosure, the light source further comprises a fixation pedestal for a fixed connection with the color filter substrate. Specifically, the fixation pedestal comprises a first light-shielding part and a second light-shielding part spaced apart from each other, and an intermediate part sandwiched between the first light-shielding part and the second light-shielding part. Furthermore, the light-emitting face is located on the intermediate part, the first light-shielding part is closer to the color filter substrate than the second light-shielding part, and the first light-shielding part and the second light-shielding part adjoin to the light guide layer respectively with their respective sides facing the light guide layer.

According to a specific implementation, in the display device provided by an embodiment of the present disclosure, the printed circuit board and the light source are located on adjacent sides of the backplate.

According to a specific implementation, in the display device provided by an embodiment of the present disclosure, the printed circuit board comprises a backlight circuit board electrically connected with the light source via a conductor, wherein the conductor comprises one or more sub conductors located on the color filter substrate or located on the color filter substrate and the array substrate respectively.

According to a specific implementation, the display device provided by an embodiment of the present disclosure further comprises: an adhesive frame located on a side of the backplate provided with the printed circuit board and sandwiched between the array substrate and the backplate, wherein the adhesive frame adjoins to the array substrate with a side facing the array substrate, and the adhesive frame adjoins to the backplate with a side facing the backplate.

According to a specific implementation, in the display device provided by an embodiment of the present disclosure, the backplate comprises: a backplate body located on a side of the reflective layer facing away from the light guide layer, and a folded part located on a side of the backplate provided with the printed circuit board or the light source, wherein the folded part comprises a single-layer structure or a dual-layer structure.

BRIEF DESCRIPTION OF DRAWINGS

By referring to the following drawings and reading detailed description of the nonrestrictive embodiments represented by the drawings, other features, objectives and advantages of the present application will become more obvious. In the drawings.

DETAILED DESCRIPTION OF EMBODIMENTS

Figure 1:
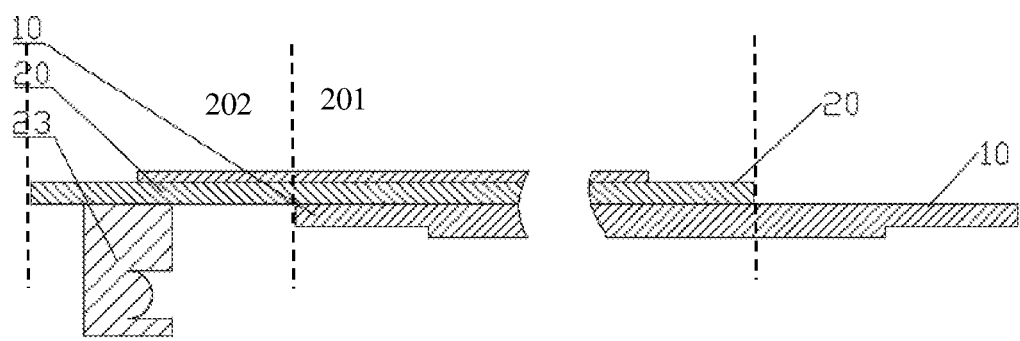
FIG. 1 is a schematic structure view of a display panel according to an embodiment of the present disclosure.

The present application will be further explained in detail in combination with the drawings and the embodiments. It may be understood that the specific embodiments described herein are only used for explaining the present application, instead of limiting the present application in any sense. Besides, it should be further noted that in order to facilitate the description, the drawings only show the core parts related to the present application, rather than all parts.

It should be noted that the embodiments in the present application and the features of these embodiments may be combined with each other under the circumstances that there is no conflict. The present application will be explained in detail with reference to the drawings and the embodiments.

In the following description, each element in the display panel or display device according to embodiments of the present disclosure will be represented by the following reference numerals: 10—array substrate, 12—adhesive frame, 20—color filter substrate, 201—first region, 202—second region, 23—light source, 230—sub light source, 24—light-emitting face, 25—fixation pedestal, 26—first light-shielding part, 27—second light-shielding part, 250—intermediate part, 28—light-shielding strip, 30—backplate, 301—backplate body, 302—folded part, 40—reflective layer, 50—light guide layer, 60—printed circuit board, 61—backlight circuit board, 70—conductor, 700—sub conductor, 80—liquid crystal layer, and 81—electrical connector.

Referring to FIG. 1, a schematic structure view of a display panel according to an embodiment of the present disclosure is shown. Specifically, as shown in FIG. 1, the display panel comprises an array substrate 10 and a color filter substrate 20 arranged oppositely, and a light source 23 located on a side of the color filter substrate 20 facing the array substrate 10 (i.e., on the lower side in the drawing). Besides, in the display panel proposed by the present disclosure, the color filter substrate 20 further comprises a first region 201 and a second region 202. For example, as shown in FIG. 1, the color filter substrate 20 comprises a first region 201 and a second region 202 located on the left side and the right side respectively, wherein an orthogonal projection of the array substrate 10 on the color filter substrate 20 is located in the first region 201, and the light source 23 is located in the second region 201 of the color filter substrate 20.

Furthermore, in an embodiment of the present disclosure, a liquid crystal layer may be further provided between the array substrate 10 and the color filter substrate 20, thereby obtaining a liquid crystal display panel. In this case, for example a light source 23 (e.g., LEDs) for providing backlight illumination to the liquid crystal layer may be directly arranged on the color filter substrate 20, for instance, on a side of the color filter substrate 20 facing the array substrate 10. Furthermore, on the color filter substrate 20 of the display panel, the light source 23 and an orthogonal projection of the array substrate 10 are further located in different regions respectively, i.e., one is located in the first region 201, and the other is located in the second region 202.

In contrast, according to a traditional scheme, in a liquid crystal display panel, a light source for providing backlight for instance is generally arranged on the same side of the entire display panel as the printed circuit board, and meanwhile, the backplate on the bottom also needs to be U-folded so as to fix a light strip and make a liquid crystal panel. Therefore, in the traditional liquid crystal display panel, it is very difficult to reduce the thickness of the liquid crystal display module. any further However, in the technical solution proposed by the present application, the light source is directly arranged (e.g., directly integrated) on a side of the color filter substrate facing the array substrate, and advantageously, on a different side from the printed circuit board, such that the backplate no longer needs to be U-folded for the purpose of fixing the light source. Therefore, the display panel according to embodiments of the present disclosure may have a smaller thickness and a relatively simplified structure at the same time, which helps to reduce the processing difficulty and the production cost of the entire display panel.

It needs to be noted herein that section views of the display panel taken on the side provided with a light source and on the opposite side (e.g., the side provided with a printed circuit board) are shown respectively on the left and on the right in FIG. 1, wherein the relative positions between the array substrate, the color filter substrate and the light source on respective sides can be seen clearly.

Figure 2:
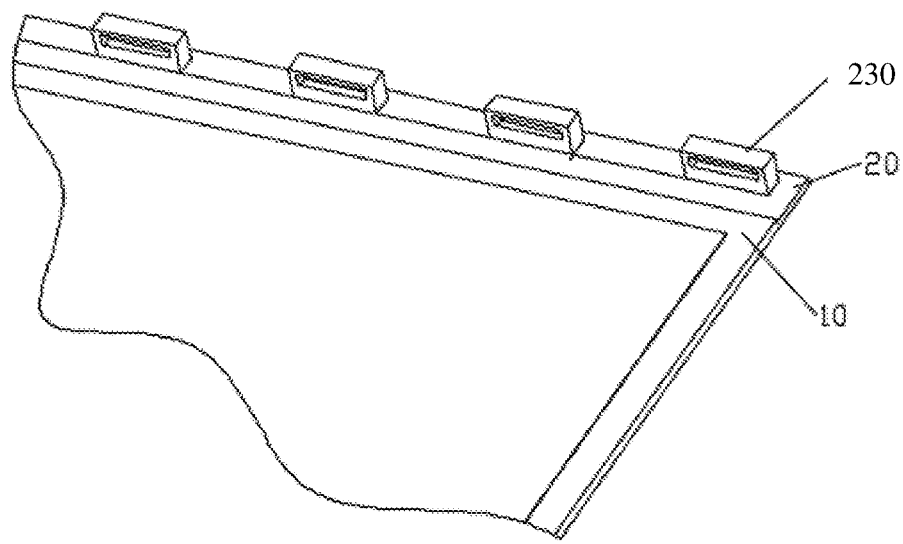
FIG. 2 is a schematic view showing the arrangement of the light source in a display panel according to an embodiment of the present disclosure.

Referring to FIG. 2, a schematic view of the light source in a display panel according to an embodiment of the present disclosure is shown. Specifically, as shown in FIG. 2, in the display panel, the light source 23 may comprise a plurality of sub light sources 230. Furthermore, these sub light sources 230 are arranged at intervals along a linear direction on a side of the color filter substrate 20 facing the array substrate 10. In this way, the integration of the light source on the color filter substrate is facilitated, which helps to reduce the processing difficulty of the display panel and the corresponding production cost.

Furthermore, the linear arrangement direction of these sub light sources 230 on the color filter substrate 20 remains parallel to a length direction of the color filter substrate 20. Therefore, the plurality of sub light sources may occupy a relatively small space in the entire display panel or in a display device comprising the same, which helps to reduce the width or the length of the entire display panel or display device.

Further optionally, among these sub light sources 230, any two adjacent sub light sources 230 are spaced from each other by a same interval on the color filter substrate 20. In this way, light emitted from the plurality of sub light sources may be more even after passing through a light guide plate for instance, which helps to obtain a better display effect of the display panel.

Figure 3:
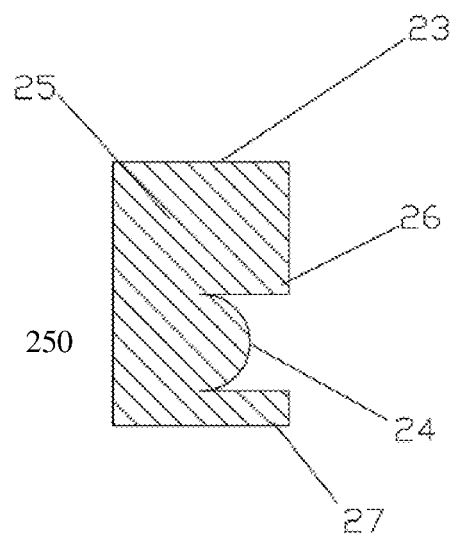
FIG. 3 is a schematic structure view of the light source in a display panel according to an embodiment of the present disclosure.

Next, referring further to FIG. 3, a schematic structure view of a light source in a display panel according to an embodiment of the present disclosure is shown. As can be seen from FIG. 1 and FIG. 3, in the display panel, the light source 23 comprises a fixation pedestal 25 for a fixed connection with the color filter substrate 20 and a light-emitting face 24 on a side facing the array substrate 10 (i.e., the right side in the drawing). Specifically, as shown in FIG. 3, the fixation pedestal 25 may comprise a first light-shielding part 26 and a second light-shielding part 27 spaced apart from each other, and an intermediate part 250 sandwiched between the first light-shielding part 26 and the second light-shielding part 27, wherein the light-emitting face 24 is located on the right side of the intermediate part 250 (i.e., on a side facing the array substrate 10), and the first light-shielding part 26 is closer to the color filter substrate 20 than the second light-shielding part 27.

As an optional embodiment, in the display panel provided by the present disclosure, the light-emitting face 24 represents a surface from which light generated by the light source 23 is emitted out, and such a light-emitting face 24 may be designed in various geometric forms, e.g., a flat surface, a curved surface, an irregular surface, or the like. Besides, by providing the first light-shielding part 26, the second light-shielding part 27 and the intermediate part 250, the emission range of light emitted out from the light-emitting face 24 may be controlled flexibly, which helps to couple such emitted light into the subsequent light guide layer for instance with a higher efficiency. Finally, light emitted out from the color filter substrate will have a higher intensity, which facilitates a good display effect of the entire display panel or display device.

Figure 4:
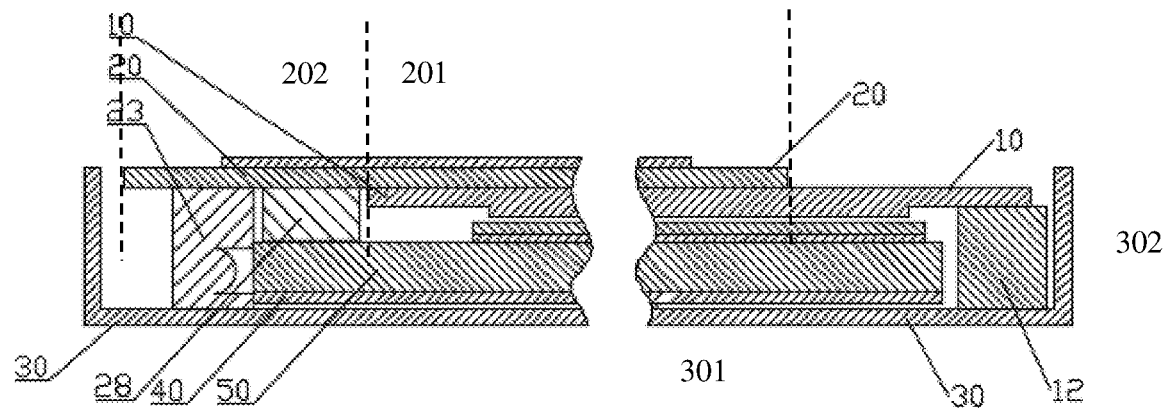
FIG. 4 is a schematic structure view of a display device according to an embodiment of the present disclosure.

According to another aspect of the present disclosure, a display device is further provided. Referring to FIG. 4, a schematic structure view of a display device according to an embodiment of the present disclosure is shown. Specifically, the display device may comprise a backplate 30 located at the bottom, and a reflective layer 40, a light guide layer 50, an array substrate 10 and a color filter substrate 20 arranged sequentially on the backplate 30. Besides, the display device is further provided with a light source 23, which is located on a side of the color filter substrate 20 facing the array substrate 10. In addition, as mentioned above with reference to FIG. 1, the color filter substrate 20 comprises a first region 201 and a second region 202, wherein an orthogonal projection of the array substrate 10 on the color filter substrate 20 is located in the first region 201, and the light source 23 is located in the second region 202. Furthermore, as shown in FIG. 4, in the display device provided by an embodiment of the present disclosure, a light-emitting face 24 of the light source 30 faces the light guide layer 50, and a printed circuit board 60 is further provided on another side of the backplate 30 (i.e., on the side opposite to the light source 23).

It needs to be pointed out herein that in the display device shown in FIG. 4, schematic structure views of the side provided with the light source and the side provided with the printed circuit board are shown respectively on the left and on the right.

Further optionally, in the display device provided by an embodiment of the present disclosure, the backplate 30 may comprise a backplate body 301 located on a side of the reflective layer 40 facing away from the light guide layer 50, and folded parts 302 located on respective sides thereof. Advantageously, the folded part 302 of the backplate 30 may comprise a single-layer structure or a dual-layer structure. In this way, in the display device provided by an embodiment of the present disclosure, the backplate 30 no longer needs to be U-folded at all, which helps to further reduce the thickness of the display device. Besides, as mentioned above, the light source 23 is formed on a side of the color filter substrate 20 facing the array substrate 10, and on the side provided with the light source 23, the edge of the color filter substrate 20 further extends beyond the edge of the array substrate 10, which effectively avoids the interference between the array substrate 10 and the light source 23 and facilitates a display effect with a relatively high quality. Moreover, the light source 23 is further arranged on a side surface of the light guide layer 50, such that backlight for instance may be provided to the entire display device from the side surface, which helps to further reduce the thickness of the display device. As an example, in the display device provided by an embodiment of the present disclosure, the light source 23 is integrated on a side of the color filter substrate 20 facing the array substrate 10, and furthermore, the light source 23 is formed on a different side of the backplate 30 from the printed circuit board (e.g., on opposite sides or adjacent sides). In this way, the structure of the display device can be simplified. For example, on the side of the backplate provided with the printed circuit board, no U-folded part is needed any more, which helps to reduce the thickness of the display device. Meanwhile, the processing steps on the side of the backplate provided with the printed circuit board may be decreased, which reduces the processing difficulty of the display device.

Besides, according to the above description, in the display device, the light-emitting face 24 of the light source 23 faces the light guide layer 50, such that light emitted from the light source 23 may propagate in the light guide layer 50 and finally exit from the entire display device via the array substrate 10 and the color filter substrate 20 located above, thereby achieving display of the image.

Furthermore, in the display device provided by an embodiment of the present disclosure, a light-shielding strip 28 is further formed on a side of the color filter substrate 20 facing the backplate 30, wherein an orthogonal projection of the light-shielding strip 28 on the color filter substrate 20 is sandwiched between orthogonal projections of the array substrate 10 and the light source 23 on the color filter substrate 20.

In an embodiment of the present disclosure, using the light-shielding strip 28 may reduce the possibility that light directly exits from the color filter substrate 20 without passing through the array substrate 10, thus reducing the possibility of light leakage at the light incident light of the display device. As an example, the light-shielding strip 28 may be formed by adhering polyethylene terephthalate (PET, plastic) with a light reflective or absorbing function to the array substrate 10. Alternatively, the light-shielding strip 28 may also be formed by directly applying a fluid curable adhesive such as a black UV adhesive (such as a photosensitive adhesive) or a Tuffy adhesive.

Furthermore, according to an embodiment of the present disclosure, in the above display device, the light-shielding strip 28 adjoins to the light source 23 with a side facing the light source 23 (i.e., the right side). This may prevent light emitted by the light source 23 from being emitted out of the display device from the gap between the light-shielding strip 28 and the light source 23, thus reducing the possibility of light leakage from the display device.

Furthermore, in the display device provided by an embodiment of the present disclosure, the light-shielding strip 28 adjoins to the light guide layer 50 with a side facing the light guide layer 50. In this way, the light-shielding strip 28 may help to fix the light guide layer 50 and support the color filter substrate 20, thereby avoiding suspension the display device at edge and improving reliability of the display device.

Furthermore, in the display device provided by an embodiment of the present disclosure, the light-shielding strip 28 is arranged along an edge of the color filter substrate 20 facing the array substrate 10 (e.g., along a length direction of the color filter substrate 20), so as to separate the color filter substrate 20 from the light guide layer 50. This may avoid the possibility that light emitted by the light source 23 exits the display device directly from the color filter substrate 20 without passing through the array substrate 10, i.e., reducing the possibility of light leakage of the display device.

Referring to FIG. 3 and FIG. 4, furthermore, in the display device provided by an embodiment of the present disclosure, the light source 23 comprises a fixation pedestal 25, wherein the fixation pedestal 25 is used for a fixed connection with the color filter substrate 20. Specifically, the fixation pedestal 25 comprises a first light-shielding part 26 and a second light-shielding part 27 spaced apart from each other, and an intermediate part 250 sandwiched between the first light-shielding part 26 and the second light-shielding part 27. Besides, the light-emitting face 24 is located on the intermediate part 250 between the first light-shielding part 26 and the second light-shielding part 27, e.g., on the right side of the intermediate part 250. Moreover, the first light-shielding part 26 and the second light-shielding part 27 adjoin to the light guide layer 50 respectively with their respective right sides.

In an embodiment of the present disclosure, the first light-shielding part 26, the second light-shielding part 27 and the intermediate part 250 may help to limit the emission range of light emitted from the light-emitting face 24. Therefore, light emitted from the light-emitting face 24 enters the light guide layer 50 first, and then exits from the color filter substrate 20 after passing through the light guide layer 50 and the array substrate 10, thereby achieving image display. This reduces the possibility of light leakage from the display device and improves the reliability of the display device.

Furthermore, in the display device provided by an embodiment of the present disclosure, the printed circuit board 60 and the light source 23 are located on adjacent sides of the backplate 30.

In an embodiment of the present disclosure, the printed circuit board is usually arranged on a long side of the backplate 30, and the light source 23 may be arranged on a short side of the backplate 30. When the number of the sub light sources remains constant, arranging the light source on the short side facilitates a smaller pitch between two adjacent sub light sources, i.e., a smaller value of P, wherein P indicates a central pitch between two adjacent sub light sources. Assuming that letter A represents a distance between the side of the light source facing the display area and the effective display area of the display device, in the design of the display device, if the value of A/P remains unchanged, the smaller the value of P is, the smaller the value of A will be. That is, the bezel of the display device may be designed to be narrower. Therefore, when the value of P decreases, the value of A/P is apt to increase, which makes it easier to improve the Hotspot of the display device (the defect of brightness non uniformity). If the value of P is ensured to remain constant, less sub light sources may be used, which may reduce the production cost of the display device.

Figure 5:
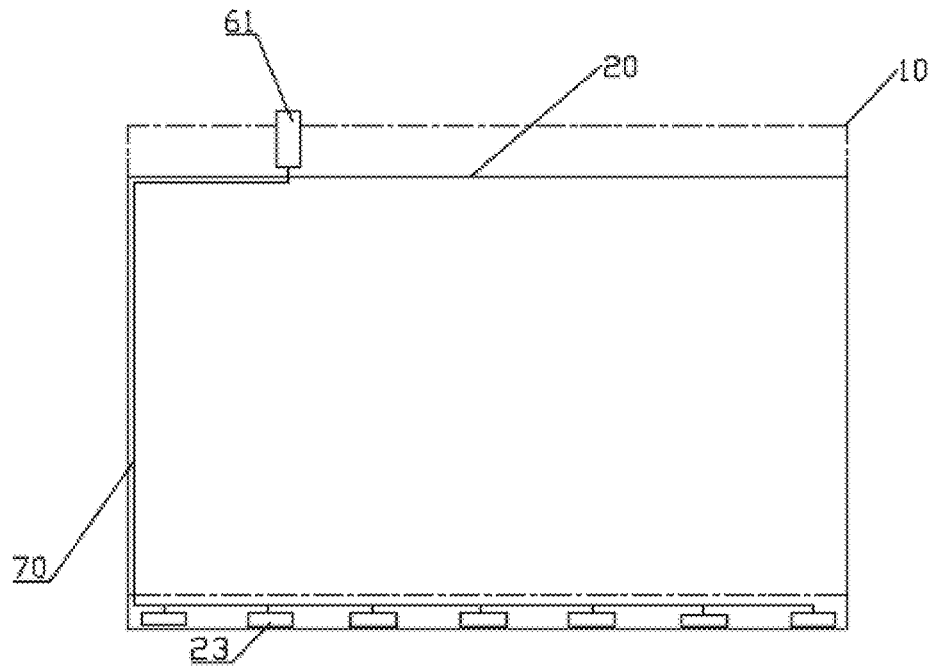
FIG. 5 is a schematic view showing wirings of the conductor on the color filter substrate in a display device according to an embodiment of the present disclosure.
Figure 6:
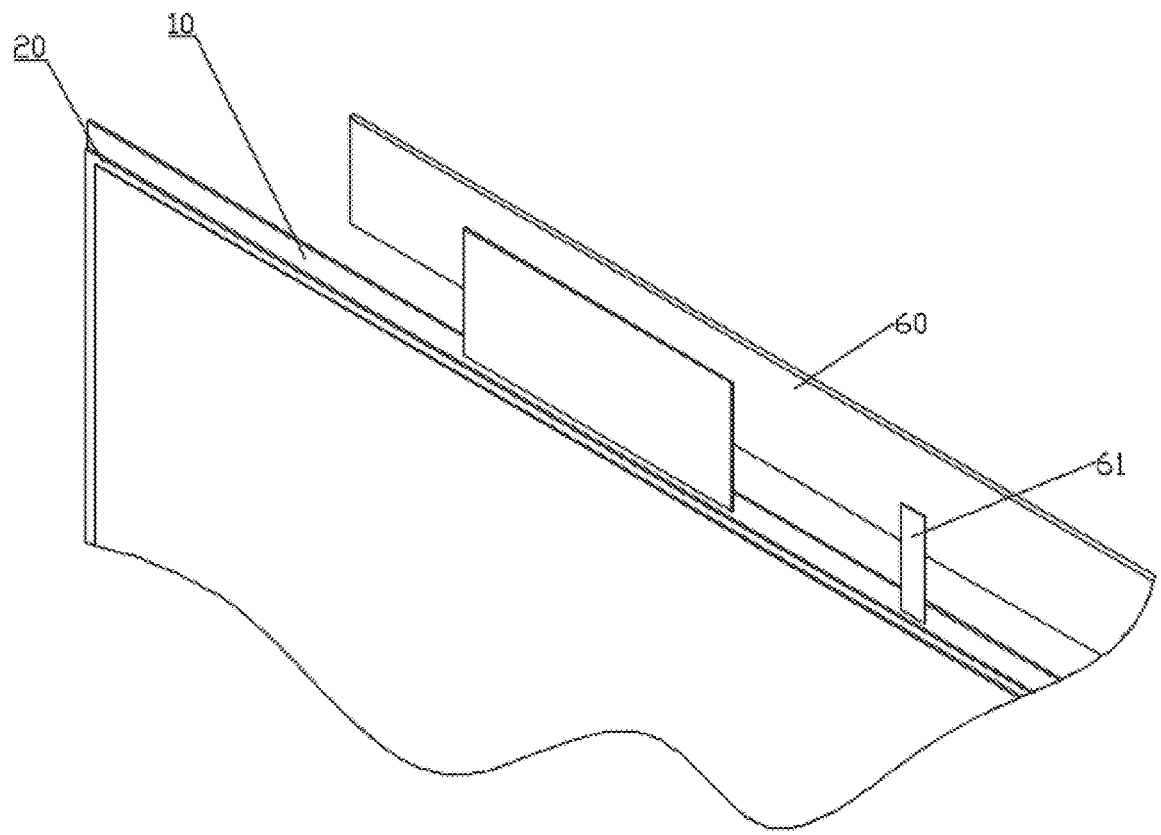
FIG. 6 is a schematic structure view of a display device according to an embodiment of the present disclosure.
Figure 7:
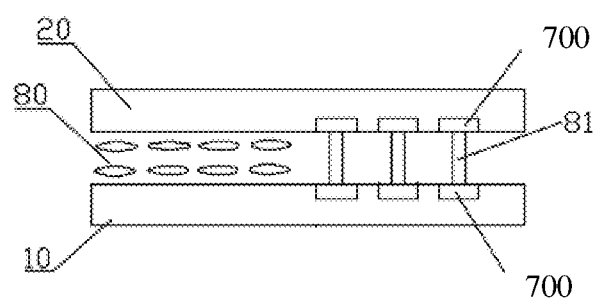
FIG. 7 is a schematic structure view of the sub conductors on the color filter substrate and the array substrate in a display device according to an embodiment of the present disclosure.

Referring to FIGS. 5-7, furthermore, the printed circuit board 60 comprises a backlight circuit board 61, wherein the backlight circuit board 61 is electrically connected with the light source 23 via a conductor 70.

The conductor 70 may comprise one or more sub conductors 700 arranged on the color filter substrate 20 or arranged on the color filter substrate 20 and the array substrate 10 respectively.

It needs to be noted herein that FIG. 5 shows a schematic view showing wirings of the conductor on the color filter substrate, wherein the dashed line indicates the position of the array substrate. The light source may be controlled to emit light or not by connecting to the backlight circuit board via the conductor.

Apparently, the conductor may be a metal wire on the color filter substrate or the array substrate, or Indium Tin Oxide (ITO, single-layer Indium Tin Oxide) on the color filter substrate or the array substrate. Besides, the conductor may be formed simultaneously when the color filter substrate and the array substrate are formed. Moreover, the light source may be integrated on the color filter substrate. Therefore, the conductor may be only arranged on the color filter substrate, and the light source circuit board is electrically connected with the light source via the conductor, wherein the light source circuit board may control the light source and provide power to the light source. Referring to FIG. 7, upon actual conditions, the conductor 70 (comprising one or more sub conductors 700) may be distributed on the color filter substrate and the array substrate, and the sub conductor 700 on the color filter substrate and the sub conductor 700 on the array substrate are electrically connected via an electrical connector 81. Furthermore, the electrical connector 81 may be further arranged on the liquid crystal layer 80 between the array substrate and the color filter substrate, wherein the electrical connector 81 may comprise but is not limited to a sealant, an Anisotropic Conductive Film (ACT) adhesive or a silver paste. In this way, the electrical connection between the sub conductor on the color filter substrate and the sub conductor on the array substrate may be achieved. Obviously, the conductor may be further arranged on an edge of the display device. That is, the light source may be electrically connected with the backlight circuit board via wires on the edge. Optionally, when the printed circuit board and the light source are located on adjacent sides of the display panel, the conductor has a shorter length, which may reduce the production cost of the display device.

Furthermore, on a side of the backplate 30 provided with the printed circuit board 60, and between the array substrate 10 and the backplate 30, an adhesive frame 12 may be arranged. Specifically, the adhesive frame 12 adjoins to the array substrate 10 with a side facing the array substrate 10, and the adhesive frame 12 adjoins to the backplate 30 with a side facing the backplate 30.

It needs to be pointed out that FIG. 4 shows on the right a schematic structure view of the display device at a side thereof provided with the printed circuit board. Specifically, the adhesive frame is configured to support the array substrate and protect the array substrate at the edge, thus improving the reliability of the display device.

Furthermore, the backplate 30 comprises a backplate body 301 located at the bottom and a folded part 302 located on a side of the backplate close to the printed circuit board 60, wherein the folded part 302 comprises a single-layer or dual-layer structure.

In an embodiment of the present disclosure, the backplate 30 comprises a single-layer or dual-layer folded part 302 on a side close to the printed circuit board. As compared with the traditional scheme in which the backplate has a U-folded structure, according to embodiments of the present disclosure, the thickness of the display device may be reduced, such that the display device may be lighter and thinner. Besides, when the folded part 302 of the backplate 30 is a dual-layer structure, the overall strength of the backplate is even higher, which helps to improve the strength and reliability of the display device.

Furthermore, the backplate 30 further comprises a folded part 302 on a side close to the light source 23, which folded part 302 may also be a single-layer or dual-layer structure.

In an embodiment of the present disclosure, the backplate 30 further comprises a single-layer or dual-layer folded part 302 on a side close to the light source. In this case, the thickness of the display device may be further reduced, such that the display device is lighter and thinner. Besides, when the folded part of the backplate 30 comprises a dual-layer structure, the overall strength of the backplate is even higher, which helps to improve the strength and reliability of the display device.

The above descriptions are only preferred embodiments of the present application and explanations of the employed technical principles. Those skilled in the art should understand that the scope of the present application is not limited by the technical solutions formed by a specific combination of the above technical features. Instead, it should cover other technical solutions formed by a random combination of the above technical feature or equivalent features without deviating from the inventive concept. For example, the present application may comprise technical solutions formed by replacing the above features by technical features having similar functions as disclosed in the present application (but not limited thereto).

The invention claimed is:

1. A display panel, comprising:
an array substrate and a color filter substrate arranged oppositely, and
a light source on a side of the color filter substrate facing the array substrate,
wherein the color filter substrate comprises a first region and a second region,
wherein an orthogonal projection of the array substrate on the color filter substrate is in the first region, and
wherein the light source is in the second region,
wherein the light source comprises:
a fixation pedestal for a fixed connection with the color filter substrate, and
a light-emitting face facing the array substrate,
wherein the fixation pedestal comprises a first light-shielding part and a second light-shielding part spaced apart from each other, and an intermediate part sandwiched between the first light-shielding part and the second light-shielding part, and
wherein the light-emitting face is on the intermediate part, and the first light-shielding part is closer to the color filter substrate than the second light-shielding part.

2. The display panel according to claim 1,
wherein the light source comprises a plurality of sub light sources, the plurality of sub light sources are at intervals along a linear direction in the second region.

3. The display panel according to claim 2, wherein the linear direction comprises a length direction of the color filter substrate.

4. The display panel according to claim 2, wherein the plurality of sub light sources are at equal intervals.

5. A display device, comprising:
a backplate,
a reflective layer, a light guide layer, an array substrate, and a color filter substrate arranged on the backplate sequentially, and
a light source on a side of the color filter substrate facing the array substrate,
wherein the color filter substrate comprises a first region and a second region,
wherein an orthogonal projection of the array substrate on the color filter substrate is in the first region, and
wherein the light source is in the second region,
wherein the display device further comprises a light-shielding strip on a side of the color filter substrate facing the array substrate, and
wherein an orthogonal projection of the light-shielding strip on the color filter substrate is between orthogonal projections of the array substrate and the light source on the color filter substrate.

6. The display device according to claim 5,
wherein the light source comprises a light-emitting face facing the light guide layer, and
wherein the display device further comprises a printed circuit board located on a different side of the backplate from the light source.

7. The display device according to claim 5, wherein the light-shielding strip adjoins to the light source with a side facing the light source, and the light-shielding strip adjoins to the light guide layer with a side facing the light guide layer.

8. The display device according to claim 5, wherein the light-shielding strip extends along a length direction of the color filter substrate.

9. The display device according to claim 6,
wherein the light source further comprises a fixation pedestal for a fixed connection with the color filter substrate,
wherein the fixation pedestal comprises a first light-shielding part and a second light-shielding part spaced apart from each other, and an intermediate part between the first light-shielding part and the second light-shielding part,
wherein the light-emitting face is on the intermediate part,
wherein the first light-shielding part is closer to the color filter substrate than the second light-shielding part, and
wherein the first light-shielding part and the second light-shielding part adjoin to the light guide layer respectively with their respective sides facing the light guide layer.

10. The display device according to claim 6, wherein the printed circuit board and the light source are on adjacent sides of the backplate.

11. The display device according to claim 6,
wherein the printed circuit board comprises a backlight circuit board electrically connected with the light source via a conductor,
wherein the conductor comprises one or more sub conductors on the color filter substrate or on the color filter substrate and the array substrate respectively.

12. The display device according to claim 6, further comprising:
an adhesive frame on a side of the backplate provided with the printed circuit board and between the array substrate and the backplate,
wherein the adhesive frame adjoins to the array substrate with a side facing the array substrate, and the adhesive frame adjoins to the backplate with a side facing the backplate.

13. The display device according to claim 6, wherein the backplate comprises:
a backplate body on a side of the reflective layer facing away from the light guide layer, and
a folded part on a side of the backplate provided with the printed circuit board or the light source,
wherein the folded part comprises a single-layer structure or a dual-layer structure.

* * * * *